US007653647B2

(12) United States Patent
Borthakur et al.

(10) Patent No.: US 7,653,647 B2
(45) Date of Patent: Jan. 26, 2010

(54) SYSTEM AND METHOD FOR DETERMINING FILE SYSTEM DATA INTEGRITY

(75) Inventors: Dhrubajyoti Borthakur, San Jose, CA (US); Nur Premo, San Jose, CA (US); Joseph Pasqua, Menlo Park, CA (US)

(73) Assignee: Symantec Operating Corporation, Mountain View, CA (US)

( * ) Notice: Subject to any disclaimer, the term of this patent is extended or adjusted under 35 U.S.C. 154(b) by 449 days.

(21) Appl. No.: 10/869,723

(22) Filed: Jun. 16, 2004

(65) Prior Publication Data

US 2005/0114338 A1    May 26, 2005

Related U.S. Application Data

(63) Continuation-in-part of application No. 10/723,704, filed on Nov. 26, 2003, now Pat. No. 7,328,217.

(51) Int. Cl.
*G07F 17/30* (2006.01)
(52) U.S. Cl. ............................ 707/102; 707/1; 707/100; 707/200; 707/201; 709/223; 709/224; 713/172; 713/175; 713/176; 713/180
(58) Field of Classification Search ................. 707/100, 707/102
See application file for complete search history.

(56) References Cited

U.S. PATENT DOCUMENTS

| 6,026,474 | A |   | 2/2000 | Carter et al. |
| 6,058,483 | A | * | 5/2000 | Vannel ........................ 713/156 |
| 6,240,401 | B1 |   | 5/2001 | Oren et al. |
| 6,240,429 | B1 |   | 5/2001 | Thornton et al. |
| 6,286,013 | B1 |   | 9/2001 | Reynolds et al. |
| 6,389,538 | B1 |   | 5/2002 | Gruse et al. |

(Continued)

OTHER PUBLICATIONS

"The Business Rationale for Distributed (Remote) Document Capture," Verity White Paper, Oct. 2003, downloaded from http://www.cardiff.com/cms/groups/public/documents/collateral/mk0535.pdf, 12 pages.

(Continued)

*Primary Examiner*—Neveen Abel Jalil
*Assistant Examiner*—Farhan M Syed
(74) *Attorney, Agent, or Firm*—Meyertons, Hood, Kivlin, Kowert, Goetzel, P.C.; B. Noel Kivlin; Anthony M. Petro

(57) ABSTRACT

A system and method for determining file system data integrity. In one embodiment, the system includes a storage device configured to store data and a file system configured to manage access to the storage device, to store plurality of files, to store a respective signature of each of the plurality of files, and to compare a respective signature of a given file against a corresponding validation signature. In one specific implementation, the system further includes a validation signature inventory including a plurality of validation signatures, and the file system is further configured to validate a particular file by retrieving a corresponding particular validation signature from the validation signature inventory and comparing the corresponding particular validation signature against the respective signature of the particular file. In another specific implementation, the file system is further configured to store the corresponding validation signature of the given file in a write-once storage attribute.

24 Claims, 5 Drawing Sheets

U.S. PATENT DOCUMENTS

| | | | | |
|---|---|---|---|---|
| 6,768,943 | B2 * | 7/2004 | Pearson | 701/301 |
| 6,970,866 | B1 | 11/2005 | Pravetz et al. | |
| 2001/0025311 | A1 | 9/2001 | Arai et al. | |
| 2002/0049731 | A1 | 4/2002 | Kotani | |
| 2002/0120679 | A1 * | 8/2002 | Hayton et al. | 709/203 |
| 2003/0045353 | A1 * | 3/2003 | Paulsen et al. | 463/40 |
| 2003/0093509 | A1 * | 5/2003 | Li et al. | 709/223 |
| 2003/0093556 | A1 * | 5/2003 | Yeung et al. | 709/238 |
| 2003/0151633 | A1 | 8/2003 | George et al. | |
| 2003/0154271 | A1 | 8/2003 | Baldwin et al. | |
| 2003/0172368 | A1 | 9/2003 | Alumbaugh et al. | |
| 2003/0188160 | A1 * | 10/2003 | Sunder et al. | 713/165 |
| 2004/0002942 | A1 * | 1/2004 | Pudipeddi et al. | 707/1 |
| 2004/0003013 | A1 * | 1/2004 | Coulthard et al. | 707/205 |
| 2004/0059866 | A1 | 3/2004 | Patel et al. | |
| 2004/0205310 | A1 * | 10/2004 | Yamagami | 711/162 |
| 2004/0225730 | A1 | 11/2004 | Brown et al. | |
| 2005/0015461 | A1 | 1/2005 | Richard et al. | |
| 2005/0038813 | A1 | 2/2005 | Apparao et al. | |
| 2005/0091655 | A1 * | 4/2005 | Probert et al. | 718/100 |
| 2005/0114363 | A1 | 5/2005 | Borthakur et al. | |
| 2005/0114381 | A1 | 5/2005 | Borthakur et al. | |
| 2005/0114406 | A1 | 5/2005 | Borthakur et al. | |
| 2006/0004759 | A1 | 1/2006 | Borthakur et al. | |
| 2006/0004787 | A1 | 1/2006 | Borthakur et al. | |

OTHER PUBLICATIONS

"Native XML Management With Documentum," Documentum Technical White Paper, Jul. 2003, downloaded from http://software.emc.com/collateral/content_management/documentum_family/wp_tech_xml.pdf, 15 pages.

Autonomy XML White Paper, Oct. 2003, downloaded from http://www.autonomy.com/content/downloads/White%20Papers/index.en.html, 11 pages.

Autonomy Technology White Paper, Nov. 2003, downloaded from http://www.autonomy.com/content/downloads/White%20Papers/index.en.html, 19 pages.

"DCMI Abstract Data Model," Dublin Core Metadata Initiative, Feb. 2004, downloaded from http://www.ukoln.ac.uk/metadata/dcmi/abstract-model/2004-02-04/, 17 pages.

Staples et al., "The Fedora Project: An Open-source Digital Object Repository Management System," in D-Lib Magazine, v. 9, No. 4, Apr. 2003, downloaded from http://web.archive.org/web/20040203065018/www.dlib.org/dlib/april03/staples/04staples.html, 12 pages.

Wildermuth, "A Developer's Perspective on WinFS: Part 1," Mar. 2004, downloaded from http://web.archive.org/web/20050414063209/http://msdn.microsoft.com/data/winfs/default.aspx?pull=/library/en-us/dnwinfsta/html/winfsdevpersp.asp, 10 pages.

Tripwire File Signature Database (FSDB) Announcement, Aug. 5, 2003, downloaded from http://web.archive.org/web/20040612065311/www.tripwire.com/fsdb/faq.pdf, 5 pages.

* cited by examiner

SYSTEM AND METHOD FOR DETERMINING FILE SYSTEM DATA INTEGRITY

PRIORITY CLAIM

This application is a continuation in part of application Ser. No. 10/723,704, entitled "System and Method for Detecting and Storing File Identity Change Information Within a File System" and filed on Nov. 26, 2003 now U.S. Pat. No. 7,328,217.

BACKGROUND OF THE INVENTION

1. Field of the Invention

This invention relates to computer systems and, more particularly, to file-based storage systems.

2. Description of the Related Art

Computer systems often process large quantities of information, including application data and executable code configured to process such data. In numerous embodiments, computer systems provide various types of mass storage devices configured to store data, such as magnetic and optical disk drives, tape drives, etc. To provide a regular and systematic interface through which to access their stored data, such storage devices are frequently organized into hierarchies of files by software such as an operating system. Often a file defines a minimum level of data granularity that a user can manipulate within a storage device, although various applications and operating system processes may operate on data within a file at a lower level of granularity than the entire file.

Increasingly, computer systems are under threat by malicious or errant software applications that may cause corruption or destruction of file data. For example, viruses, worms, and other rogue software may infect a computer system. In some instances, such malicious software may randomly or deliberately erase data stored within data files. Such software may also attempt to conceal itself by modifying the behavior of existing program files, which otherwise might not be suspected of malicious behavior. In other instances, a program may malfunction due to an a programming or hardware error or another event that changes its behavior, which may in turn cause corruption of file contents.

Regardless of its source, the consequences of data or program file corruption may be severe, resulting in potentially unrecoverable data loss or system failure. Techniques to prevent malicious corruption tend to center around identifying known threats (such as known viruses, worms, etc.) and quarantining them before they cause serious damage. Disciplined hardware and software design and testing practices hope to mitigate accidental corruption due to program error, by testing for known areas of design vulnerability. However, new malicious threats are constantly emerging, and it is difficult if not impossible to verify that a computer system and its software are entirely error-free. Thus, existing practices that are directed towards causes and modes of corruption generally cannot verify that a set of files are known definitively to be in an uncorrupted state, because the possibility of an unknown agent of corruption cannot be eliminated. Brute force methods, such as comparing the entire contents of a file against a copy believed to be good (i.e., a golden copy), may enable detection of file corruption, but such methods are exorbitantly expensive to implement with regularity for large quantities of data. Further, the golden copy may itself be vulnerable to corruption.

SUMMARY

Various embodiments of a system and method for determining file system data integrity are disclosed. In one embodiment, the system may include a storage device configured to store data and a file system configured to manage access to the storage device, to store plurality of files, to store a respective signature of each of the plurality of files, and to compare a respective signature of a given file against a corresponding validation signature.

In one specific implementation, the system may further include a validation signature inventory including a plurality of validation signatures, and the file system may be further configured to validate a particular file by retrieving a corresponding particular validation signature from the validation signature inventory and comparing the corresponding particular validation signature against the respective signature of the particular file. In another specific implementation, the file system may be further configured to store the corresponding validation signature of the given file in a write-once storage attribute associated with the given file.

A method is also contemplated which, in one embodiment, may include storing a plurality of files, storing a respective signature of each of the plurality of files, and comparing a respective signature of a given file against a corresponding validation signature.

Figure 1:
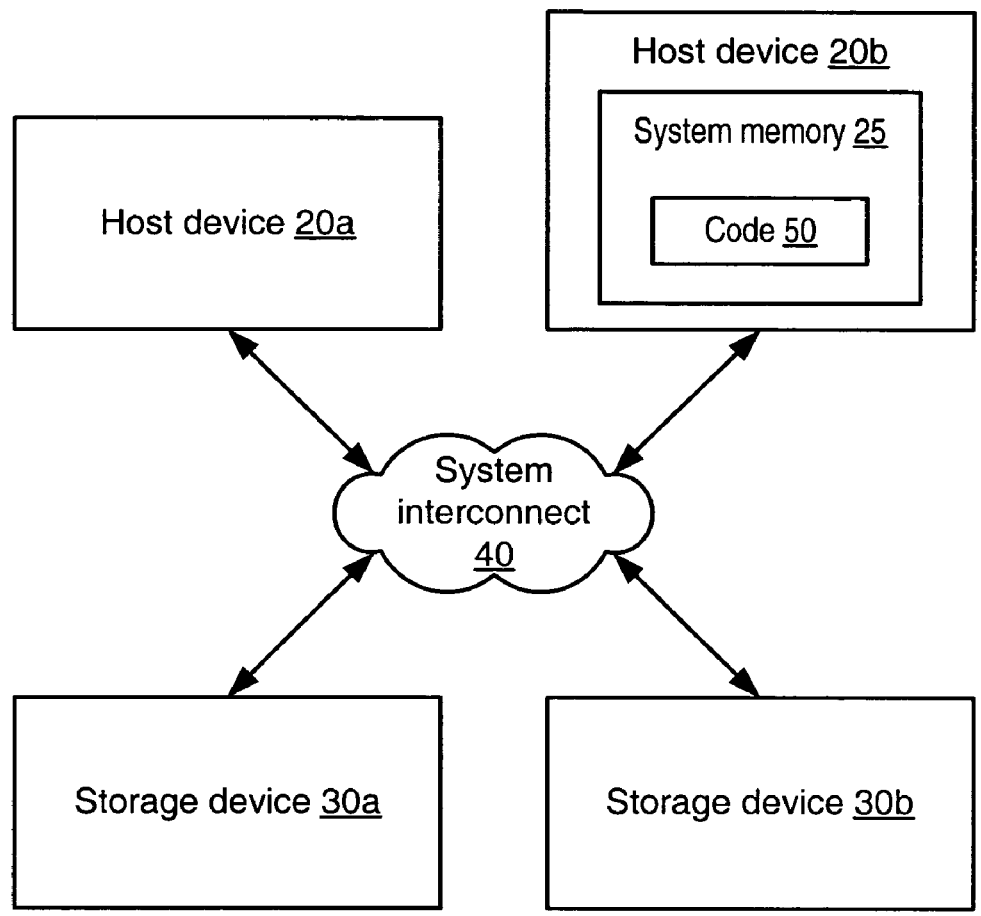
FIG. 1 is a block diagram illustrating one embodiment of a storage system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Computer System Overview

Turning now to FIG. 1, a block diagram of one embodiment of a computer system is shown. In the illustrated embodiment, system 10 includes a plurality of host devices 20a and 20b coupled to a plurality of storage devices 30a and 30b via a system interconnect 40. Further, host device 20b includes a system memory 25 in the illustrated embodiment. For simplicity of reference, elements referred to herein by a reference number followed by a letter may be referred to collectively by the reference number alone. For example, host devices 20a and 20b and storage devices 30a and 30b may be referred to collectively as host devices 20 and storage devices 30.

In various embodiments of system 10, host devices 20 may be configured to access data stored on one or more of storage devices 30. In one embodiment, system 10 may be implemented within a single computer system, for example as an integrated storage server. In such an embodiment, for example, host devices 20 may be individual processors, system memory 25 may be a cache memory such as a static RAM (SRAM), storage devices 30 may be mass storage devices such as hard disk drives or other writable or rewritable media, and system interconnect 40 may include a peripheral bus interconnect such as a Peripheral Component Interface (PCI) bus. In some such embodiments, system interconnect 40 may include several types of interconnect between host devices 20 and storage devices 30. For example, system interconnect 40 may include one or more processor buses (not shown) configured for coupling to host devices 20, one or more bus bridges (not shown) configured to couple the processor buses to one or more peripheral buses, and one or more storage device interfaces (not shown) configured to couple the peripheral buses to storage devices 30. Storage device interface types may in various embodiments include the Small Computer System Interface (SCSI), AT Attachment Packet Interface (ATAPI), Firewire, and/or Universal Serial Bus (USB), for example, although numerous alternative embodiments including other interface types are possible and contemplated.

In an embodiment of system 10 implemented within a single computer system, system 10 may be configured to provide most of the data storage requirements for one or more other computer systems (not shown), and may be configured to communicate with such other computer systems. In an alternative embodiment, system 10 may be configured as a distributed storage system, such as a storage area network (SAN), for example. In such an embodiment, for example, host devices 20 may be individual computer systems such as server systems, system memory 25 may be comprised of one or more types of dynamic RAM (DRAM), storage devices 30 may be standalone storage nodes each including one or more hard disk drives or other types of storage, and system interconnect 40 may be a communication network such as Ethernet or Fibre Channel. A distributed storage configuration of system 10 may facilitate scaling of storage system capacity as well as data bandwidth between host and storage devices.

In still another embodiment, system 10 may be configured as a hybrid storage system, where some storage devices 30 are integrated within the same computer system as some host devices 20, while other storage devices 30 are configured as standalone devices coupled across a network to other host devices 20. In such a hybrid storage system, system interconnect 40 may encompass a variety of interconnect mechanisms, such as the peripheral bus and network interconnect described above.

It is noted that although two host devices 20 and two storage devices 30 are illustrated in FIG. 1, it is contemplated that system 10 may have an arbitrary number of each of these types of devices in alternative embodiments. Also, in some embodiments of system 10, more than one instance of system memory 25 may be employed, for example in other host devices 20 or storage devices 30. Further, in some embodiments, a given system memory 25 may reside externally to host devices 20 and storage devices 30 and may be coupled directly to a given host device 20 or storage device 30 or indirectly through system interconnect 40.

In many embodiments of system 10, one or more host devices 20 may be configured to execute program instructions and to reference data, thereby performing a computational function. In the illustrated embodiment, such program instructions and/or data are stored as code 50 within system memory 25. In some embodiments, system memory 25 may be one embodiment of a computer-accessible medium configured to store such program instructions and data. However, in other embodiments, program instructions and/or data may be received, sent or stored upon different types of computer-accessible media. Generally speaking, a computer-accessible medium may include storage media or memory media such as magnetic or optical media, e.g., disk or CD-ROM included in system 10 as storage devices 30. A computer-accessible medium may also include volatile or non-volatile media such as RAM (e.g. SDRAM, DDR SDRAM, RDRAM, SRAM, etc.), ROM, etc, that may be included in some embodiments of system 10 as system memory 25. Further, a computer-accessible medium may include transmission media or signals such as electrical, electromagnetic, or digital signals, conveyed via a communication medium such as network and/or a wireless link, which may be included in some embodiments of system 10 as system interconnect 40.

In some embodiments, program instructions and data stored within a computer-accessible medium as described above may implement an operating system that may in turn provide an environment for execution of various application programs. For example, a given host device 20 may be configured to execute a version of the Microsoft Windows operating system, the Unix/Linux operating system, the Apple Macintosh operating system, or another suitable operating system. Additionally, a given host device may be configured to execute application programs such as word processors, web browsers and/or servers, email clients and/or servers, and multimedia applications, among many other possible applications. It is contemplated that in some embodiments, any of the software methods or modules described in greater detail below (whether operating system or file system components, applications, or other types of software components) may be implemented as one or more instances of code 50 within one or more instances of a computer-accessible medium, such as system memory 25, for example.

During execution on a given host device 20, either the operating system or a given application may generate requests for data to be loaded from or stored to a given storage device 30. For example, code corresponding to portions of the operating system or an application itself may be stored on a given storage device 30, so in response to invocation of the desired operation system routine or application program, the corresponding code may be retrieved for execution. Similarly, operating system or application execution may produce data to be stored.

Many operating system embodiments provide data and control structures for organizing the storage space provided by storage devices 30 into files. In various embodiments, the data structures may include one or more tables configured to store information such as, for example, the identity of each file, its location within storage devices 30 (e.g., a mapping to a particular physical location within a particular storage device), as well as other information about each file as described in greater detail below. Also, in various embodiments, the control structures may include executable routines for manipulating files, such as, for example, function calls for changing file identity and for modifying file content as described in greater detail below. Collectively, these data and control structures may be referred to herein as a file system, and the particular data formats and protocols implemented by a given file system may be referred to herein as the format of the file system.

In some embodiments, a file system may be integrated into the operating system such that any access to data stored on storage devices 30 is governed by the control and data structures of the file system. Different operating systems may implement different native file systems using different formats, but in some embodiments, a given operating system may include a file system that supports multiple different types of file system formats, including file system formats native to other operating systems. In such embodiments, the various file system formats supported by the file system may be referred to herein as local file systems. Additionally, in some embodiments, a file system may be implemented using multiple layers of functionality arranged in a hierarchy, as illustrated in FIG. 2.

Figure 2:
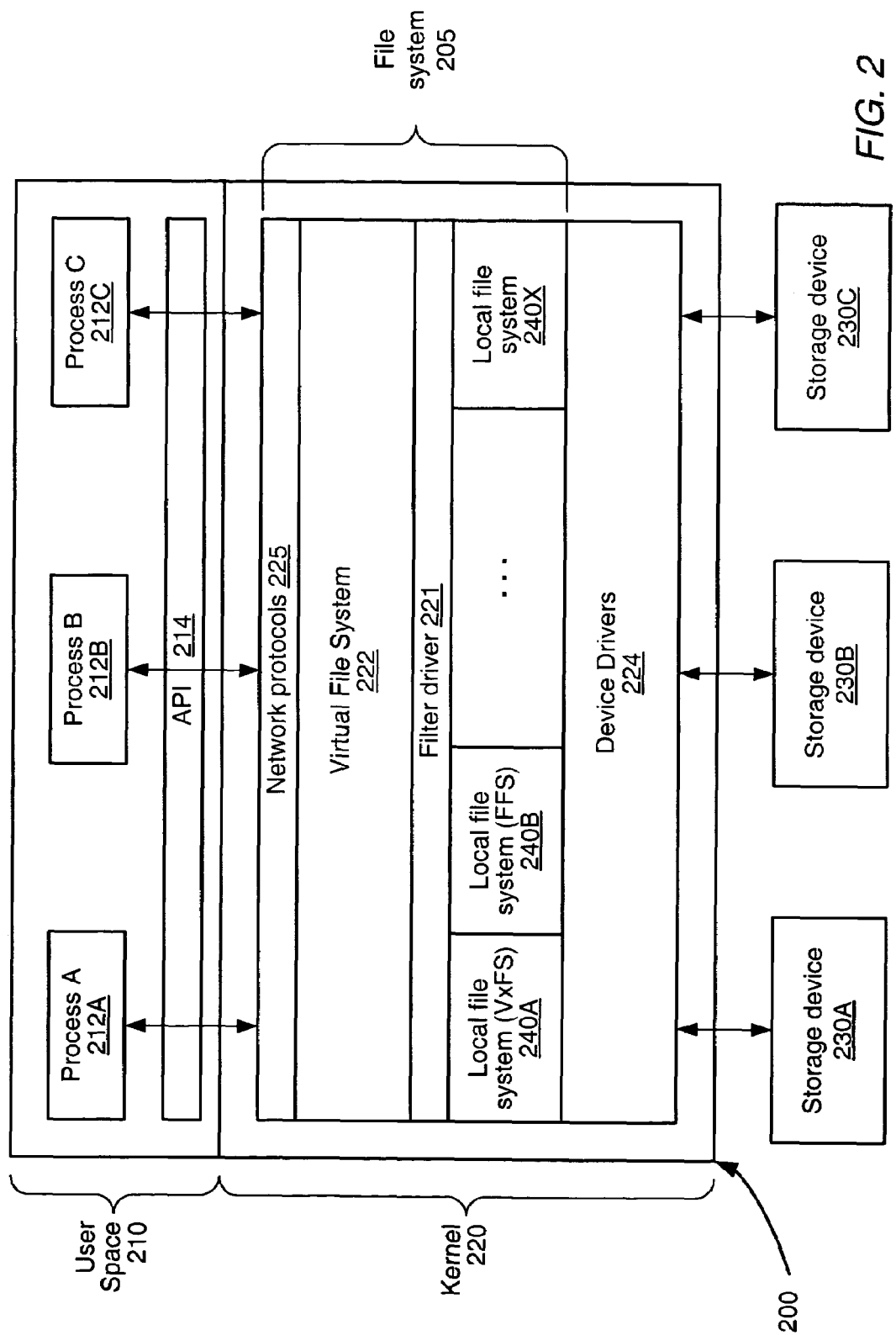
FIG. 2 is a block diagram illustrating one embodiment of an operating system architecture and its interface to storage devices.

FIG. 2 illustrates one embodiment of an operating system architecture and its interface to storage devices. In the illustrated embodiment, operating system 200 includes a user space 210 and a kernel space 220. User space 210 includes a plurality of processes 212A-C, each of which may correspond to a given user application. In some embodiments, some application processes 212 within user space 210 may be distinct from operating system 200. Such processes may be said to operate within an environment provided by operating system 200, or to operate "on top of" operating system 200. Each of processes 212 may be configured to access storage devices 230A-C through calls to application programming interface (API) 214. API 214 provides processes 212 with access to file system 205, which is configured to operate within kernel space 220. In one embodiment, storage devices 230 may be illustrative of storage devices 30 of FIG. 1, and it is contemplated that in some embodiments an arbitrary number of storage devices 230 may be provided. Also, in one embodiment, any of operating system 200, file system 205, processes 212 or components or subcomponents thereof may be configured to execute on one or more host devices 20 of FIG. 1, for example as program instructions and data stored within a computer-accessible medium, such as code 50 stored within system memory 25 of FIG. 1.

In one embodiment, each of processes 212 may correspond to a given user application, and each may be configured to access storage devices 230A-C through calls to API 214. API 214 provides processes 212 with access to various components of file system 205. For example, in one embodiment API 214 may include function calls exposed by file system 205 that a given process 212 may invoke, while in other embodiments API 214 may support other types of interprocess communication. It is contemplated that in some embodiments, an arbitrary number of processes 212 may be implemented. It is further contemplated that in some embodiments, processes configured to execute in kernel space may be configured to access file system 205 via API 214 or other APIs specific to kernel space processes.

As described above with respect to storage system 10 of FIG. 1, a given host device 20 may reside in a different computer system from a given storage device 30, and may access that storage device via a network. Likewise, with respect to operating system 200, in one embodiment a given process such as process 212A may execute remotely and may access storage devices 230 over a network. In the illustrated embodiment, file system 205 includes network protocols 225 to support access to the file system by remote processes. In some embodiments, network protocols 225 may include support for the Network File System (NFS) protocol or the Common Internet File System (CIFS) protocol, for example, although it is contemplated that any suitable network protocol may be employed, and that multiple such protocols may be supported in some embodiments.

File system 205 may be configured to support a plurality of local file systems. In the illustrated embodiment, file system 205 includes a VERITAS (VxFS) format local file system 240A, a Berkeley fast file system (FFS) format local file system 240B, and a proprietary (X) format local file system 240X. However, it is contemplated that in other embodiments, any number or combination of local file system formats may be supported by file system 205. To provide a common interface to the various local file systems 240, file system 205 includes a virtual file system 222. In one embodiment, virtual file system 222 may be configured to translate file system operations originating from processes 212 to a format applicable to the particular local file system 240 targeted by each operation. Additionally, in the illustrated embodiment operating system 200 includes device drivers 224 through which local file systems 240 may access storage devices 230. Device drivers 224 may implement data transfer protocols specific to the types of interfaces employed by storage devices 230. For example, in one embodiment device drivers 224 may provide support for transferring data across SCSI and ATAPI interfaces, though in other embodiments device drivers 224 may support other types and combinations of interfaces.

In the illustrated embodiment, file system 205 also includes filter driver 221. In some embodiments, filter driver 221 may be configured to monitor each operation entering file system 205 and, subsequent to detecting particular types of operations, to cause additional operations to be performed or to alter the behavior of the detected operation. For example, in one embodiment filter driver 221 may be configured to combine multiple write operations into a single write operation to improve file system performance. In an embodiment described in greater detail below, filter driver 221 may be configured to compute a signature of a file subsequent to detecting a write to that file. In still another embodiment, filter driver 221 may be configured to store information, such as records, associated with particular files subsequent to detecting certain kinds of operations on those files, as described in greater detail below. It is contemplated that in some embodiments, filter driver 221 may be configured to implement one or more combinations of the aforementioned operations, including other filter operations not specifically mentioned.

It is noted that filter driver 221 is part of file system 205 and not an application or process within user space 210. Consequently, filter driver 221 may be configured to operate independent of applications and processes within the user space 210. Alternatively, or in addition to the above, filter driver 221 may be configured to perform operations in response to requests received from applications or processes within the user space 210.

It is further noted that in some embodiments, kernel space 220 may include processes (not shown) that generate accesses to storage devices 230, similar to user space processes 212. In such embodiments, processes executing in kernel space 220 may be configured to access file system 205 through a kernel-mode API (not shown), in a manner similar to user space processes 212. Thus, in some embodiments, all accesses to storage devices 230 may be processed by file system 205, regardless of the type or space of the process originating the access operation.

Numerous alternative embodiments of operating system 200 and file system 205 are possible and contemplated. For example, file system 205 may support different numbers and formats of local file systems 240, or only a single local file system 240. In some embodiments, network protocol 225 may be omitted or integrated into a portion of operating system 200 external to file system 205. Likewise, in some embodiments virtual file system 222 may be omitted or disabled, for example if only a single local file system 240 is in use. Additionally, in some embodiments filter driver 221 may be implemented within a different layer of file system 205. For example, in one embodiment, filter driver 221 may be integrated into virtual file system 222, while in another embodiment, an instance of filter driver 221 may be implemented in each of local file systems 240.

File System Content and Integrity

As described above, file system 205 may be configured to manage access to a plurality of files stored on storage devices 230. In many embodiments, each stored file may have an associated identity used by the file system to distinguish each file from other files. In one embodiment of file system 205, the identity of a file may be a file name, which may for example include a string of characters such as "filename.txt". However, in embodiments of file system 205 that implement a file hierarchy, such as a hierarchy of folders or directories, all or part of the file hierarchy may be included in the file identity. For example, a given file named "file1.txt" may reside in a directory "smith" that in turn resides in a directory "users". The directory "users" may reside in a directory "test1" that is a top-level or root-level directory within file system 205. In some embodiments, file system 205 may define a single "root directory" to include all root-level directories, where no higher-level directory includes the root directory. In other embodiments, multiple top-level directories may coexist such that no higher-level directory includes any top-level directory. The names of the specific folders or directories in which a given file is located may be referred to herein as the given file's path or path name.

In some embodiments of file system 205 that implement a file hierarchy, a given file's identity may be specified by listing each directory in the path of the file as well as the file name. Referring to the example given above, the identity of the given instance of the file named "file1.txt" may be specified as "/test1/users/smith/file1.txt". It is noted that in some embodiments of file system 205, a file name alone may be insufficient to uniquely identify a given file, whereas a fully specified file identity including path information may be sufficient to uniquely identify a given file. There may, for example, exist a file identified as "/test2/users/smith/file1.txt" that, despite sharing the same file name as the previously mentioned file, is distinct by virtue of its path. It is noted that other methods of representing a given file identity using path and file name information are possible and contemplated. For example, different characters may be used to delimit directory/folder names and file names, or the directory/folder names and file names may be specified in a different order.

The files managed by file system 205 may store application data or program information, which may collectively be referred to as file data, in any of a number of encoding formats. For example, a given file may store plain text in an ASCII-encoded format or data in a proprietary application format, such as a particular word processor or spreadsheet encoding format. Additionally, a given file may store video or audio data or executable program instructions in a binary format. It is contemplated that numerous other types of data and encoding formats, as well as combinations of data and encoding formats, may be used in files as file data.

In addition to managing access to storage devices, the various files stored on storage devices, and the file data in those files as described above, in some embodiments file system 205 may be configured to store information corresponding to one or more given files, which information may be referred to herein as metadata. Generally speaking, metadata may encompass any type of information associated with a file. In various embodiments, metadata may include information such as (but not limited to) the file identity, size, ownership, and file access permissions. Metadata may also include free-form or user-defined data such as records corresponding to file system operations, as described in greater detail below. Metadata corresponding to a file as well as the data content of files may collectively be referred to herein as file system content.

In the course of execution, operating system 200 and/or one or more of processes 212 may generate input/output (I/O) operations to access the content of one or more files managed by file system 205. For example, a process 212 may issue a file write operation to modify the contents of a given file. In some instances, the contents of a file may be corrupted either accidentally, for example due to an erroneous or runaway process 212, or intentionally, for example due to a malicious or rogue process 212 such as a virus, worm, or other hostile software. While data loss may occur if data files are corrupted, corruption of program and configuration files may be especially critical, as a system failure such as a crash may result.

Figure 3:
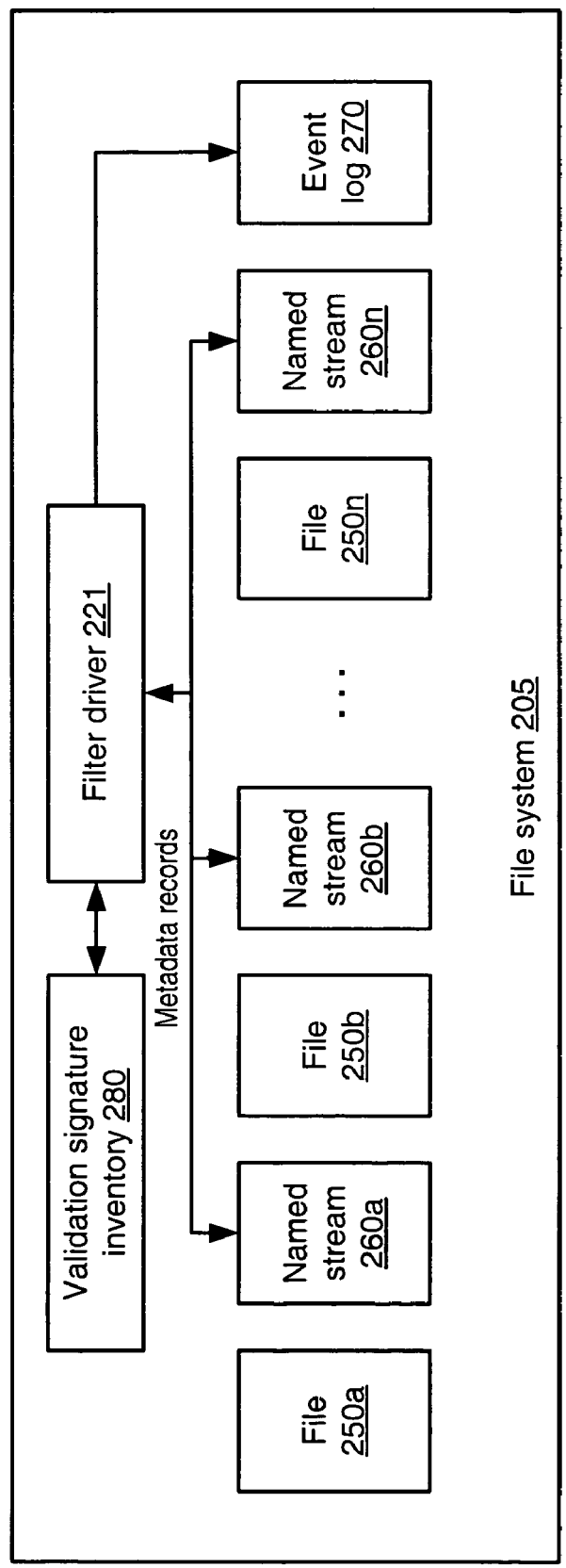
FIG. 3 is a block diagram illustrating one embodiment of a file system configured to detect files that may have been corrupted due to accidental or malicious program activity.

FIG. 3 illustrates one embodiment of a file system configured to detect files that may have been corrupted due to accidental or malicious program activity. The embodiment of file system 205 shown in FIG. 3 may include those elements illustrated in the embodiment of FIG. 2; however, for sake of clarity, some of these elements are not shown. In the illustrated embodiment, file system 205 includes filter driver 221, an arbitrary number of files 250a-n, a respective named stream 260a-n associated with each of files 250a-n, and an event log 270. File system 205 also includes a validation signature inventory 280, although in some embodiments this inventory may be implemented as one of files 250 or externally to file system 205, such as on a remote server. It is noted that a generic instance of one of files 250a-n or named streams 260a-n may be referred to respectively as a file 250 or a named stream 260, and that files 250a-n and named streams 260a-n may be referred to collectively as files 250 and named streams 260, respectively.

Files 250 may be representative of files managed by file system 205, and may in various embodiments be configured to store various types of data and program instructions as described above. In the illustrated embodiment, each of files 250 has a corresponding named stream 260. Each of named streams 260 may be configured to store metadata pertaining to its corresponding file. It is noted that files 250 and named streams 260 may be physically stored on one or more storage devices, such as storage devices 230 of FIG. 2. However, for purposes of illustration, files 250 and named streams 260 are shown as conceptually residing within file system 205.

In some embodiments, filter driver 221 may be configured to access file data stored in a given file 250. For example, filter driver 221 may be configured to detect read and/or write operations received by file system 205, and may responsively cause file data to be read from or written to a given file 250 corresponding to the received operation. In some embodiments, filter driver 221 may be configured to generate metadata corresponding to a given file 250 and store the generated metadata in the corresponding named stream 260. For example, upon detecting a file write operation directed to given file 250, filter driver 221 may be configured to update metadata corresponding to the last modified time of given file 250 and to store the updated metadata within named stream 260. Also, in some embodiments filter driver 221 may be configured to retrieve metadata corresponding to a specified file on behalf of a particular application.

Metadata may be generated in response to various types of file system activity initiated by processes 212 of FIG. 2. In some embodiments, the generated metadata may include records of arbitrary complexity. For example, in one embodiment filter driver 221 may be configured to detect various types of file manipulation operations such as file create, delete, rename, and/or copy operations as well as file read and write operations. In some embodiments, such operations may be detected in-band as described above. After detecting a particular file operation, filter driver 221 may be configured to generate a record of the operation and store the record in the appropriate named stream 260 as metadata of the file 250 targeted by the operation.

More generally, any operation that accesses any aspect of file system content, such as reading or writing of file data or metadata, may be referred to as a file system content access event. In one embodiment, filter driver 221 may be configured to generate a metadata record in response to detecting a file system content access event. It is contemplated that in some embodiments, access events targeting metadata may themselves generate additional metadata. As described in greater detail below, in the illustrated embodiment, event log 270 may be configured to store records of detected file system content access events independently of whether additional metadata is stored in a particular named stream 260 in response to event detection.

The stored metadata record may in various embodiments include various kinds of information about the file 250 and the operation detected, such as the identity of the process generating the operation, file identity, file type, file size, file owner, and/or file permissions, for example. In one embodiment, the record may include a file signature indicative of the content of file 250. A file signature may be a hash-type function of all or a portion of the file contents and may have the property that minor differences in file content yield quantifiably distinct file signatures. For example, the file signature may employ the Message Digest 5 (MD5) algorithm, which may yield different signatures for files differing in content by as little as a single bit, although it is contemplated that any suitable signature-generating algorithm may be employed. The record may also include additional information not specifically listed.

In one embodiment, a given metadata record may be generated and stored in a format that may include data fields along with tags that describe the significance of an associated data field. Such a format may be referred to as a "self-describing" data format. For example, a data element within a metadata record may be delimited by such tag fields, with the generic syntax:

<descriptive_tag>data element</descriptive_tag> where the "descriptive_tag" delimiter may describe some aspect of the "data element" field, and may thereby serve to structure the various data elements within a metadata record. It is contemplated that in various embodiments, self-describing data formats may employ any of a variety of syntaxes, which may include different conventions for distinguishing tags from data elements. In some embodiments, a self-describing data format may allow additional structural elements to be defined as desired, for example by allowing additional descriptive tags to be defined. Such embodiments of self-describing data formats may be referred to as extensible as well as self-describing.

In one embodiment, Extensible Markup Language (XML) format, or any data format compliant with any version of XML, may be used as an extensible, self-describing format for storing metadata records, although it is contemplated that in other embodiments, any suitable format may be used, including formats that are not extensible or self-describing. XML-format records may allow arbitrary definition of record fields, according to the desired metadata to be recorded. One example of an XML-format record is as follows:

```
<record sequence="1">
    <path>/test1/foo.pdf</path>
    <type>application/pdf</type>
    <user id=1598>username</user>
    <group id=119>groupname</group>
    <perm>rw-r--r--</perm>
    <md5>d41d8cd98f00b204e9800998ecf8427e</md5>
    <size>73890</size>
</record>
```

Such a record may be appended to the named stream (for example, named stream 260a) associated with the file (for example, file 250a) having the file identity "/test1/foo.pdf" subsequent to, for example, a file create operation. In this case, the number associated with the "record sequence" field indicates that this record is the first record associated with file 250a. The "path" field includes the file identity, and the "type" field indicates the file type, which in one embodiment may be provided by the process issuing the file create operation, and in other embodiments may be determined from the extension of the file name or from header information within the file, for example. The "user id" field records both the numerical user id and the textual user name of the user associated with the process issuing the file create operation, and the "group id" field records both the numerical group id and the textual group name of that user. The "perm" field records file permissions associated with file 250a in a format specific to the file system 205 and/or the operating system. The "md5" field records an MD5 signature corresponding to the file contents, and the "size" field records the length of file 250a in bytes. It is contemplated that in alternative embodiments, filter driver 221 may store records corresponding to detected operations where the records include more or fewer fields, as well as fields having different definitions and content. It is also contemplated that in some embodiments filter driver 221 may encapsulate data read from a given file 250 within the XML format, such that read operations to files may return XML data regardless of the underlying file data format. Likewise, in some embodiments filter driver 221 may be configured to receive XML format data to be written to a given file 250. In such an embodiment, filter driver 221 may be configured to remove XML formatting prior to writing the file data to given file 250.

As described above, filter driver 221 may be configured to store a signature indicative of the contents of a given file 250 within a metadata record stored within a respective named stream 260 corresponding to given file 250. In one embodiment, filter driver 221 may be configured to detect an operation to modify the content of given file 250, such as a file write operation. In such an embodiment, filter driver 221 or another module of file system 205 may be configured to recompute the signature corresponding to given file 250 to reflect the updated content, and to store the updated signature within corresponding named stream 260. For example, filter driver 221 may recompute the signature following the content-modifying operation and append a new metadata record to corresponding named stream 260 that reflects the updated signature. In some embodiments, signatures may not be immediately computed or recomputed following creation or modification of given file 250. Instead, signature generation may be performed as a lower-priority background task as computational resource availability allows, and the previous signature may be indicated as stale. In some such embodiments, file system 205 may be configured to generate a signature on demand if a request for a stale signature occurs.

As described in detail below, updates to file signatures may be used in conjunction with validation signature inventory 280 in various ways to detect undesirable changes to file content. It is also contemplated that in some embodiments, signature generation, storage and use in content validation may be performed on portions of a file rather than an entire file, or on metadata records themselves. For example, in one embodiment a signature of a named stream 260 may be computed following a modification of its metadata contents; such a signature may be stored within the named stream 260 or elsewhere. It is contemplated that any of the methods, structures, or techniques described herein may be applied at an arbitrary level of granularity or abstraction within file system 205.

It is noted that in some embodiments, metadata may be stored in a structure other than a named stream. For example, in one embodiment metadata corresponding to one or more files may be stored in another file in a database format or another format. Also, it is contemplated that in some embodiments, other software modules or components of file system 205 may be configured to generate, store, and/or retrieve metadata. For example, the metadata function of filter driver 221 may be incorporated into or duplicated by another software module.

In the illustrated embodiment, file system 205 includes event log 270. Event log 270 may be a named stream similar to named streams 260; however, rather than being associated with a particular file, event log 270 may be associated directly with file system 205. In some embodiments, file system 205 may include only one event log 270, while in other embodiments, more than one event log 270 may be provided. For example, in one embodiment of file system 205 including a plurality of local file systems 240 as illustrated in FIG. 2, one event log 270 per local file system 240 may be provided.

In some embodiments, filter driver 221 may be configured to store a metadata record in event log 270 in response to detecting a file system operation or event. For example, a read or write operation directed to a particular file 250 may be detected, and subsequently filter driver 221 may store a record indicative of the operation in event log 270. In some embodiments, filter driver 221 may be configured to store metadata records within event log 270 regardless of whether a corresponding metadata record was also stored within a named stream 260. In some embodiments event log 270 may function as a centralized history of all detected operations and events transpiring within file system 205.

Similar to the records stored within named stream 260, the record stored by filter driver 221 in event log 270 may in one embodiment be generated in an extensible, self-describing data format such as the Extensible Markup Language (XML) format, although it is contemplated that in other embodiments, any suitable format may be used. As an example, a given file 250*a* named "/test1/foo.pdf" may be created, modified, and then renamed to file 250*b* "/test1/destination.pdf" in the course of operation of file system 205. In one embodiment, event log 270 may include the following example records subsequent to the rename operation:

```
<record>
    <op>create</op>
    <path>/test1/foo.pdf</path>
</record>
<record>
    <op>modify</op>
    <path>/test1/foo.pdf</path>
</record>
<record>
    <op>rename</op>
    <path>/test1/destination.pdf</path>
    <oldpath>/test1/foo.pdf</oldpath>
</record>
```

In this example, the "op" field of each record indicates the operation performed, while the "path" field indicates the file identity of the file 250*a* operated on. In the case of the file rename operation, the "path" field indicates the file identity of the destination file 250*b* of the rename operation, and the "oldpath" field indicates the file identity of the source file 250*a*. It is contemplated that in alternative embodiments, filter driver 221 may store within event log 270 records including more or fewer fields, as well as fields having different definitions and content. In some embodiments, the event log records may be considered part of file system content along with file data and other metadata.

Validation signature inventory 280 may be used in various ways with file signatures to check file integrity. In one embodiment, validation signature inventory 280 may include a list or database of files and a corresponding validation signature for each file entry. In some embodiments, entries within validation signature inventory 280 may include fully-qualified path names that may include full path information associated with a given file 250. However, in different software installations, the exact paths of various program and data files may vary. Therefore in some embodiments, validation signature inventory 280 may index files using relative or partial path information, or by file name alone. For example, in some embodiments a given program, configuration or data file may retain the same file name, e.g., "AcroRd62.exe", regardless of the file system location to which it is installed.

The validation signature included for each file given in validation signature inventory 280 may be a trusted signature corresponding to a version of the file that is known not to be corrupted. For example, in one embodiment a software vendor may compute signatures of the various files comprising a formal release of a particular software program or package. Such signatures may be computed in a "clean" environment, for example an environment in which the files comprising the release are built from source code in a computing environment verified to be free of malicious code such as viruses, worms, etc. The vendor may then distribute the computed signatures to be included within validation signature inventory 280, either locally on a customer's system, remotely on the vendor's system (accessible through a network interface, for example), or on a third-party system. In other embodiments, a validation signature may be computed locally after a file is installed to file system 205. For example, prior to placing a computer system hosting file system 205 online and making it available for use after installing new files, an administrator or an operating system daemon or process may cause the signatures of the new files to be computed and stored within validation signature inventory 280. Numerous other methods of obtaining and distributing validation signatures to validation signature inventory 280 are possible and contemplated.

Once a validation signature for a given file 250 is available within validation signature inventory 280, the validation signature may be used with a signature stored within corresponding named stream 260 to check the integrity of file 250. (A signature stored within a named stream 260 may also be referred to as a dynamic signature, as it may change in response to changes in the content of corresponding file 250, including undesired changes.) For example, in one embodiment file system 205 may be configured to validate a given file 250 by retrieving a validation signature corresponding to given file 250 from validation signature inventory 280 and retrieving a current file signature from corresponding named stream 260. Upon comparing the two signatures, file system 205 may be configured to indicate that given file 250 is valid if the signatures match, or invalid if there is a mismatch. Although in the illustrated embodiment filter driver 221 is shown interacting with validation signature inventory 280, it is contemplated that in some embodiments, other processes or modules of file system 205 may be configured to interact with validation signature inventory 280 to retrieve and/or store signatures in addition to or instead of filter driver 221.

As noted above, in some embodiments filter driver 221 may be configured to update the signature of a file 250 as soon as an operation to modify the file is detected. In some such embodiments, filter driver 221 may also be configured to check the updated signature against a corresponding validation signature from validation signature inventory 280 at approximately the time the updated signature is written to corresponding named stream 260. In another embodiment, updating of signatures and/or comparison of updated signatures with validation signatures may be performed at an arbitrary time after an operation to modify a given file 250 completes. For example, at various intervals of time file system 205 may use the contents of event log 270 to identify recently-modified files 250, to compute updated signatures (if filter driver 221 has not already done so), and to compare updated signatures against validation signatures to validate modified files 250. In still another embodiment, comparison of an updated signature against a corresponding validation signature may occur in response to a request that occurs asynchronously with respect to the file modification operation resulting in the signature update. For example, a scanning process (such as an antivirus tool) may be configured to continuously or periodically scan files 250 (e.g., all files, or only recently modified files) to check signatures and identify unexpected changes.

It is noted that in embodiments where filter driver 221 or another module updates a file signature when the file is modified and stores the updated signature within named stream 260, no further signature computation may be required to determine validity of a given file 250. That is, in such embodiments filter driver 221 may be configured to guarantee that the most recent signature corresponding to a given file 250 is always available within a corresponding named stream 260, such that determining validity of a given file 250 may simply involve signature comparison rather than signature generation.

In still another embodiment, file system 205 may export a query interface to applications via API 214 or another API, whereby processes 212 may query file system content using a query language. In such an embodiment, a process 212 may submit a query to retrieve a current signature of one or more files 250. If validation signature inventory 280 is implemented within file system 205, the querying process 212 may also submit a query to obtain the respective validation signatures of the files 250 subject to the first query, whereas if the inventory is implemented externally to file system 205, the querying process 212 may interact with it directly such as through a specific API. The querying process 212 may then determine whether the subject files 250 are valid upon comparing their respective signatures. Alternatively, file system 205 may be configured to perform signature comparison as described above in response to receiving a query to determine the validity of a given file 250, and to return the result of the comparison (e.g., valid, invalid) to the querying process 212.

Figure 4:
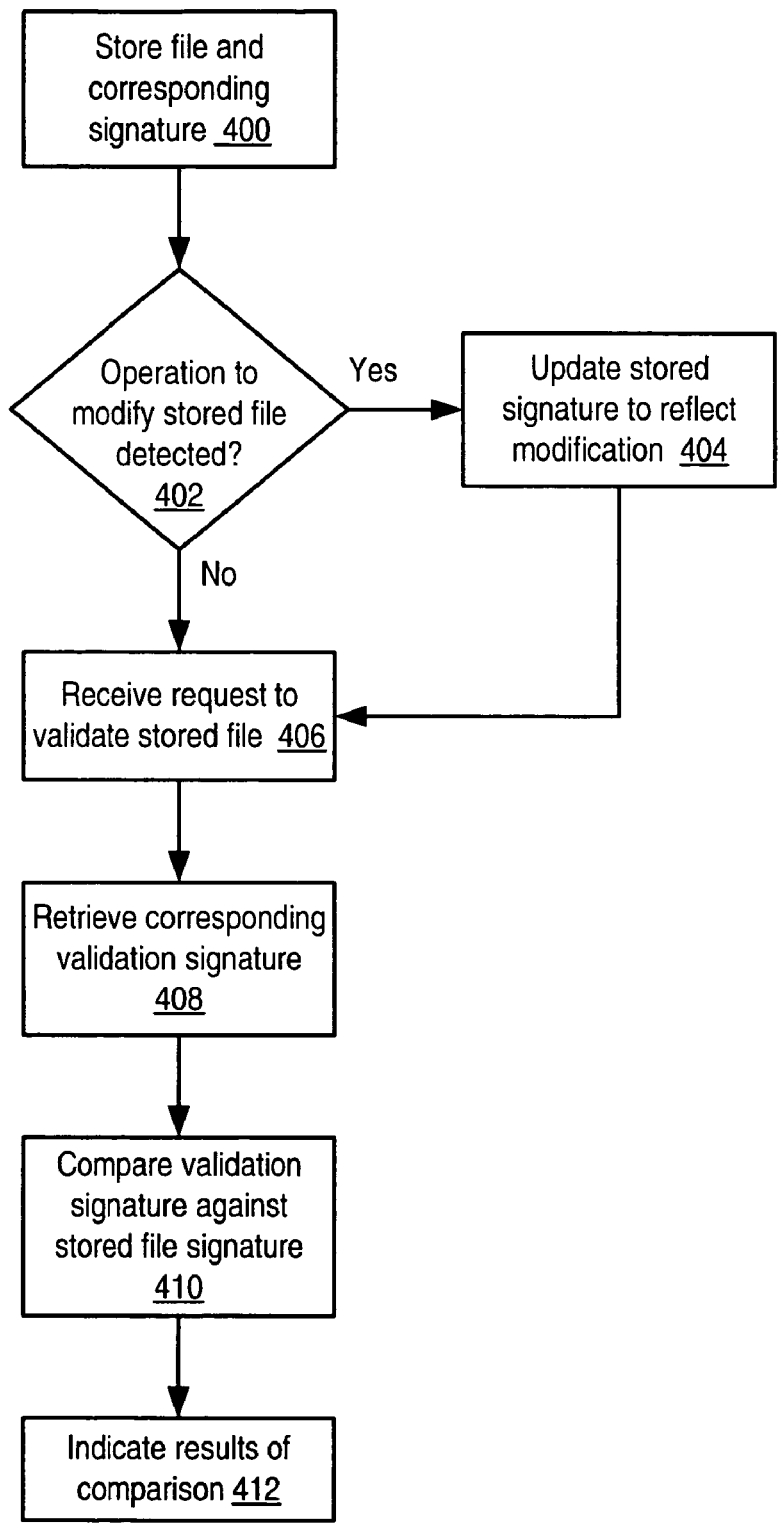
FIG. 4 is a flow diagram illustrating one embodiment of a method of determining file system content integrity.

One embodiment of a method of determining file system content integrity using signatures is illustrated in FIG. 4. Referring collectively to FIG. 1 through FIG. 4, operation begins in block 400 where a file 250 is stored along with a corresponding dynamic signature, for example by file system 205 on a storage device 230. In some embodiments, a dynamic file signature may be computed and stored at the time the file is stored in block 400, while in other embodiments signature computation and storage may be performed prior to or subsequent to file storage.

An operation to modify the stored file 250 may be detected (block 402), such as by filter driver 221, for example. If such an operation is detected, the stored dynamic signature is updated to reflect the file modification (block 404). In some embodiments, the previously computed signature may be replaced, whereas in other embodiments, earlier signatures may be retained, such as within metadata records, as part of a file history.

A request to validate the stored file 250 is then received, which may occur whether or not the stored file has been modified since it was originally stored (block 406). For example, in one embodiment a user may submit a query via a process 212 to determine whether one or more files 250 are valid. In another embodiment, file system 205 itself or a process 212 may be configured to check file validity at recurrent intervals. In still another embodiment, a request to validate a given file 250 may be generated whenever the file is modified, such as in blocks 402-404.

In response to the request to validate stored file 250, a validation signature corresponding to stored file 250 may be retrieved from a validation signature inventory 280 (block 408). In various embodiments as described above, validation signature inventory 280 may be implemented within file system 205 or externally, such as on a separate server. Once the corresponding validation signature has been retrieved, it is compared against the signature stored with file 250 (block 410). In various embodiments, validation signature retrieval and comparison may be performed within file system 205, within an application process 212, in response to a query, or in any other suitable fashion.

Following comparison, the results are indicated (block 412). For example, if a signature mismatch is detected, stored file 250 may have been corrupted. Responsively, the entity requesting the comparison may be alerted and an error condition raised.

Figure 5:
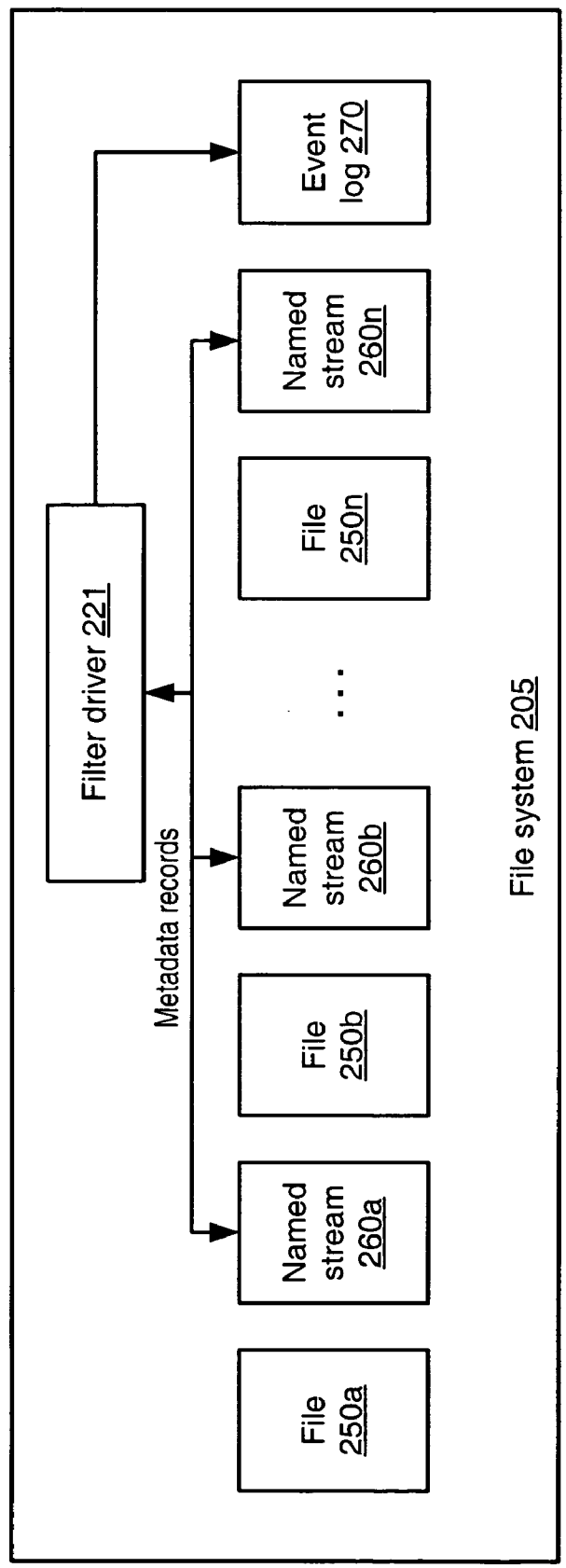
FIG. 5 is a block diagram illustrating another embodiment of a file system configured to detect files that may have been corrupted due to accidental or malicious program activity.

In an alternative embodiment to those illustrated in FIG. 3 and FIG. 4, validation signature inventory 280 may be omitted. One such embodiment of file system 205 is illustrated in FIG. 5, in which files 250, named streams 260, and event log 270 may be configured as described above with respect to FIG. 3. However, instead of maintaining validation signatures for files 250 collectively within validation signature inventory 280, in the illustrated embodiment a validation signature for a given file 250 may be maintained as metadata, for example within corresponding named stream 260.

Specifically, in one embodiment file system 205 may be configured to provide a write-once storage attribute for each file 250 for which integrity detection through signature checking is desired. A write-once storage attribute of a file

250 may in one embodiment be a data field that may have a value written to it only once during the existence of corresponding file 250. A write-once storage attribute may be read arbitrarily, but in one embodiment it may not be altered once written, and may be reset only upon deletion of corresponding file 250. In various embodiments, a write-once attribute may be stored within a metadata record stored within a named stream 260 corresponding to a given file 250, or the write-once attribute may be stored in storage other than a named stream, such as an appropriately-protected file.

File system 205 may be configured to initialize the validation signature of a given file 250 at the time the file is created, and to preserve the write-once semantics of the validation signature. For example, in one embodiment filter driver 221 may be configured to receive a validation signature to be stored with a given file 250 at file creation time, for example from an installation program via a process 212. Alternatively, filter driver 221 may be configured to generate a signature corresponding to given file 250 once all the data to be written to the file has been received. For example, filter driver 221 may be configured to detect the first close operation of given file 250, and to compute the validation signature in response. However the validation signature is generated, in one embodiment filter driver 221 may be configured to preserve write-once semantics by checking the write-once validation signature attribute of given file 250 to determine whether it contains a previously computed signature value (e.g., a non-null value). If so, filter driver 221 may decline to overwrite the stored value with the generated value. Otherwise, filter driver 221 may store the generated value in the write-once attribute.

In one embodiment, the write-once validation signature attribute of a file 250 may be a field within an XML-formatted metadata record that may be stored within corresponding named stream 260 as described above. For example, after a file "/test1/foo.pdf" is created, the following metadata record may be stored by filter driver 221:

```
<record sequence="1">
    <path>/test1/foo.pdf</path>
    <valid_md5>d41d8cd98f00b204e9800998ecf8427e</valid_md5>
    <type>application/pdf</type>
    <user id=1598>username</user>
    <group id=119>groupname</group>
    <perm>rw-r--r--</perm>
    <curr_md5>d41d8cd98f00b204e9800998ecf8427e</curr_md5>
    <size>73890</size>
</record>
```

In this example, the "valid_md5" field may reflect the write-once validation signature attribute of file "/test1/foo.pdf", and the "curr_md5" may reflect the most recent dynamic signature computed for the file. The other fields may be interpreted as described above. In some embodiments, the validation signature may be stored as an XML-tagged data field outside the scope of the other metadata records associated with file 250. As described above, in some embodiments, metadata records may include fields in addition to or different from those shown.

Once a validation signature for a given file 250 is stored within its corresponding write-once metadata attribute, signature verification may occur in any of the ways described above in conjunction with FIG. 3 and FIG. 4, with the exception that when the validation signature is to be retrieved for a file 250, it may be retrieved by file system 205 from corresponding named stream 260 rather than from a validation signature inventory 280. As described above, validation may occur in response to an application request or query, or to file system activity such as maintenance scanning or file modification.

Referring to the example just given, one example of possible file corruption is shown in the following metadata record:

```
<record sequence="2">
    <path>/test1/foo.pdf</path>
    <valid_md5>d41d8cd98f00b204e9800998ecf8427e</valid_md5>
    <type>application/pdf</type>
    <user id=1598>username</user>
    <group id=119>groupname</group>
    <perm>rw-r--r--</perm>
    <curr_md5>e7f8ca63325478dac5bb39026182a7f9</curr_md5>
    <size>73890</size>
</record>
```

Such a record may be generated following an operation to modify the content of file "/test1/foo.pdf" and following recomputation of the dynamic signature, such as described previously. Although the size of the file is unchanged, the dynamic signature as recomputed differs from the validation signature, indicating the change in file content to any agent configured to compare the two signatures.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a storage device configured to store a plurality of files; and
   a host computing device configured to implement an operating system including a file system, wherein said file system is configured to store said files to said storage device and to manage accesses to said storage device, wherein said accesses are generated by applications distinct from said operating system;
   wherein said file system is further configured to generate and store a respective signature of each of said plurality of files, and to compare a respective signature of a given one of said files against a corresponding validation signature, wherein the file system is further configured to:
      store the validation signature in a write-once storage location associated with the given one of said files; and
      prevent the validation signature stored in the write-once storage location from being altered after being stored, until the given one of said files is deleted; and
   wherein said file system is further configured to compute an updated version of said respective signature of said given file in response to detecting an operation to modify said given file, wherein said operation is generated by one of said applications, and wherein said file system is further configured to compare said updated version of said respective signature against said corresponding validation signature subsequent to computing said updated version of said respective signature.

2. The system as recited in claim 1, wherein said comparing occurs in response to a request to validate said given file that occurs asynchronously with respect to said operation to modify said given file.

3. The system as recited in claim 1, further comprising a validation signature inventory including a plurality of validation signatures, wherein said plurality of validation signatures includes said corresponding validation signature, and wherein said file system is further configured to validate a particular file by retrieving a corresponding particular validation signature from said validation signature inventory and comparing said corresponding particular validation signature against the respective signature of said particular file.

4. The system as recited in claim 1, wherein said corresponding validation signature is stored in said write-once attribute in response to a first close operation following creation of said given file.

5. The system as recited in claim 1, wherein said respective signature of said given file is stored in a metadata record associated with said given file.

6. The system as recited in claim 5, wherein said metadata record is stored in a named stream associated with said given file.

7. The system as recited in claim 5, wherein said metadata record is stored in a data format compatible with a version of Extensible Markup Language (XML) format.

8. A method, comprising:
a file system, implemented by an operating system executing on a host computing device, storing a plurality of files to a storage device;
said file system managing accesses to said storage device, wherein said accesses are generated by applications distinct from said operating system;
said file system generating and storing a respective signature of each of said plurality of files;
said file system comparing a respective signature of a given one of said files against a corresponding validation signature;
said file system storing the validation signature in a write-once storage location associated with the given one of said files;
said file system preventing the validation signature stored in the write-once storage location from being altered after being stored, until the given one of said files is deleted;
said file system computing an updated version of said respective signature of said given file in response to detecting an operation to modify said given file, wherein said operation is generated by one of said applications; and
said file system comparing said updated version of said respective signature against said corresponding validation signature subsequent to said computing.

9. The method as recited in claim 8, wherein said comparing occurs in response to a request to validate said given file that occurs asynchronously with respect to said operation to modify said given file.

10. The method as recited in claim 8, further comprising said file system validating a particular file by retrieving a corresponding particular validation signature from a validation signature inventory including a plurality of validation signatures, wherein said plurality of validation signatures includes said corresponding validation signature, and comparing said corresponding particular validation signature against the respective signature of said particular file.

11. The method as recited in claim 8, wherein said file system storing said corresponding validation signature in said write-once attribute occurs in response to a first close operation following creation of said given file.

12. The method as recited in claim 8, wherein said respective signature of said given file is stored in a metadata record associated with said given file.

13. The method as recited in claim 12, wherein said metadata record is stored in a named stream associated with said given file.

14. The method as recited in claim 12, wherein said metadata record is stored in a data format compatible with a version of Extensible Markup Language (XML) format.

15. A computer-accessible storage medium comprising program instructions, wherein the program instructions are executable to implement:
a file system of an operating system storing a plurality of files to a storage device;
said file system managing accesses to said storage device, wherein said accesses are generated by applications distinct from said operating system;
said file system generating and storing a respective signature of each of said plurality of files;
said file system comparing a respective signature of a given one of said files against a corresponding validation signature;
said file system storing the validation signature in a write-once storage location associated with the given one of said files;
said file system preventing the validation signature stored in the write-once storage location from being altered after being stored, until the given one of said files is deleted;
said file system computing an updated version of said respective signature of said given file in response to detecting an operation to modify said given file generated by one of said applications; and
said file system comparing said updated version of said respective signature against said corresponding validation signature subsequent to said computing.

16. The computer-accessible storage medium as recited in claim 15, wherein said comparing occurs in response to a request to validate said given file that occurs asynchronously with respect to said operation to modify said given file.

17. The computer-accessible storage medium as recited in claim 15, wherein the program instructions are further executable to implement said file system validating a particular file by retrieving a corresponding particular validation signature from a validation signature inventory including a plurality of validation signatures, wherein said plurality of validation signatures includes said corresponding validation signature, and comparing said corresponding particular validation signature against the respective signature of said particular file.

18. The computer-accessible storage medium as recited in claim 15, wherein said file system storing said corresponding validation signature in said write-once attribute occurs in response to a first close operation following creation of said given file.

19. The computer-accessible storage medium as recited in claim 15, wherein said respective signature of said given file is stored in a metadata record associated with said given file.

20. The computer-accessible storage medium as recited in claim 19, wherein said metadata record is stored in a named stream associated with said given file.

21. The computer-accessible storage medium as recited in claim 19, wherein said metadata record is stored in a data format compatible with a version of Extensible Markup Language (XML) format.

22. The system as recited in claim 1, wherein in response to detecting a mismatch between said updated version of said respective signature and said corresponding validation signature, said file system is further configured to generate an error condition indicative of possible corruption of said given file.

23. The method as recited in claim 8, further comprising:
in response to detecting a mismatch between said updated version of said respective signature and said corresponding validation signature, said file system generating an error condition indicative of possible corruption of said given file.

24. The computer-accessible storage medium as recited in claim 15, wherein the program instructions are further executable to implement:
in response to detecting a mismatch between said updated version of said respective signature and said corresponding validation signature, said file system generating an error condition indicative of possible corruption of said given file.

* * * * *

UNITED STATES PATENT AND TRADEMARK OFFICE
CERTIFICATE OF CORRECTION

PATENT NO.      : 7,653,647 B2                                  Page 1 of 1
APPLICATION NO. : 10/869723
DATED           : January 26, 2010
INVENTOR(S)     : Borthakur et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 545 days.

Signed and Sealed this

Twenty-third Day of November, 2010

David J. Kappos
*Director of the United States Patent and Trademark Office*